United States Patent [19]
Raatz

[11] 3,735,225
[45] May 22, 1973

[54] CONTROL DEVICE FOR SWITCHING RECTIFIER SYSTEMS

[75] Inventor: Eckart Raatz, Berlin, Germany

[73] Assignee: Licentia Patent-Verwaltungs G.m.b.H., Frankfurt, Germany

[22] Filed: Aug. 25, 1971

[21] Appl. No.: 174,736

[30] Foreign Application Priority Data

Aug. 28, 1970 Germany..................P 20 43 709.0

[52] U.S. Cl...................................318/332, 318/327

[51] Int. Cl..............................................H02p 5/16

[58] Field of Search......................318/332, 345, 327; 321/45 C

[56] References Cited

UNITED STATES PATENTS

| 3,599,063 | 8/1971 | Nanai | 318/332 |
| 3,119,058 | 1/1964 | Genuit | 321/45 C |

*Primary Examiner*—Bernard A. Gilheany
*Assistant Examiner*—Thomas Langer
*Attorney*—George H. Spencer, Harvey Kaye and Jay M. Finkelstein

[57] ABSTRACT

In a system for directing a current controller of the type employing two groups of controlled rectifiers for delivering current in respectively opposite directions, the system including a current controller for directly operating the rectifiers and a higher order controller connected for influencing the current controller and having an integrating component, means are provided for blocking the integrating component input during the changeover of operation from one rectifier group to another.

3 Claims, 2 Drawing Figures

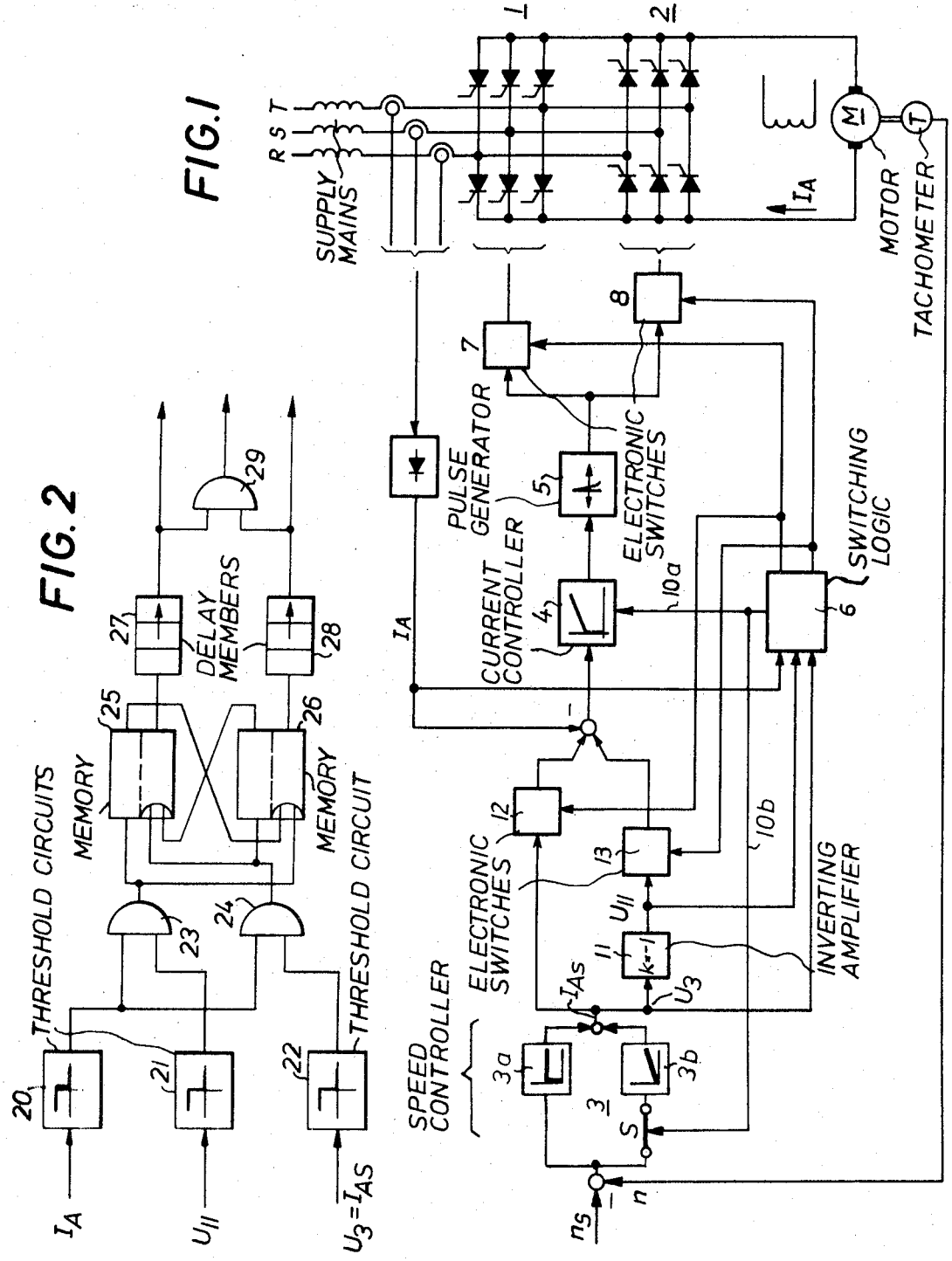

CONTROL DEVICE FOR SWITCHING RECTIFIER SYSTEMS

BACKGROUND OF THE INVENTION

The present invention relates to a control device for reversing rectifiers in a circuit in which there is to be no circulation of current between the rectifiers for the two current directions, particularly in a circuit in which two rectifier groups are connected in parallel so that the rectifiers of one group are poled in the opposite direction from those of the other group and the two groups are controlled so that only one is conductive at any one time.

It is known to include in circuits of this type a current controller which influences a pulse generator and which is blocked during the switching from the one to the other current rectifier group, and to connect one or a plurality of higher-order controllers to the current controller, at least one of these higher-order controllers having an integrating component.

Higher-order controllers mean controllers belonging to control circuits which are superimposed on the current control circuit. The output voltage of the higher-order controller is the rated value for the respectively underlying control circuit.

Known current converting drives are predominantly operated according to the current conducting technique, i.e., the speed or voltage control is superimposed on a current control. The speed controller and current controller are usually provided in the form of a PI controller. The circuitry of such a PI controller is disclosed in the magazine "Technische Mitteilungen AEG-Telefunken" (AEG-Telefunken Technical News), 1968, page 468, FIG. 1 (top right).

The superimposition of further control circuits is provided, for example, in position control drives where a position controller controls the speed controller. In this case the output of the position controller furnishes the rated speed value and the output of the speed controller furnishes the rated current value.

In reversing current rectifiers in circuits without circulating current, where the triggering pulses are switched from the one converter group to the other, it is known that during the pulse switching phase, i.e., when the rated current value has changed its polarity and the actual current, which is controlled to follow the rated value, has become zero, both rectifier groups are switched off. At the same time the current controller is blocked. A pause, during which no current flows, occurs for the drive and, according to the circuitry employed, has a duration of 4-10ms. During this time without current the control circuit is interrupted and the drive runs without any control.

If a speed controller with PI (proportional-integral) behavior is connected to the current controller, for example, the speed deviation which produces the change in the rated current value polarity controls, during the pause when no current flows, the I component of the speed controller. The resulting simulated higher control deviation leads to an increased overshoot in the current and speed at the end of the pause in the current flow. This poorer dynamic behavior may be associated with additional zero current passages. This has as a result a more frequent switching-off of the rectifier groups.

SUMMARY OF THE INVENTION

It is an object of the present invention to improve the above described unfavorable dynamic behavior.

This and other objects are accomplished, in a control device for reversing rectifiers of the above described type, according to the present invention, in that, in the interval when no current flows during the switching from one rectifier group to the other, the influence of the integrating component of the higher-order controller is suppressed. The proposed measure prevents further upward integration by the I member of the higher-order controller during the interval when no current flows and thus assures that after removal of the integration block no unduly high rated current value is falsely presented.

In an advantageous embodiment of the present invention, in a control device having a speed controller with PI behavior connected to a current controller, the speed controller is formed in a known manner by a parallel connection of a P member and an I member and the input of the I member is connected to an electronic switch which switches off the parallel branch containing the I member during the interval when there is no current in the circuit being controlled.

Another advantageous feature of the present invention is that the electronic switch is controlled in synchronism with the blocking or release of the current controller.

BRIEF DESCRIPTION OF THE DRAWINGS

FIG. 1 is a block diagram of a motor control circuit incorporating an embodiment of the invention.

FIG. 2 is a block diagram of a logic device for the circuit of FIG. 1.

DESCRIPTION OF THE PREFERRED EMBODIMENTS

The illustrated embodiment of the invention is provided in a speed-controlled rectifier drive with underlying current control.

FIG. 1 illustrates a basic known circuit of a speed-controlled reversing drive in a parallel opposition connection without circulating current in which the triggering pulses are switched from the one rectifier group 1 to the other rectifier group 2, depending on the direction in which current is to be applied. The control structure is arranged in accordance with the current conducting techniques usually employed in the motor control art; i.e., the speed control is effected by regulating the motor armature current.

In the illustrated embodiment an externally excited direct current shunt motor M consititutes the driving motor. A tachometer T furnishes an indication of the actual speed value $n$ which is compared with a given rated speed value $n_s$. Based on the difference between $n_s$ and $n$, a speed controller 3 constituted by a proportional member 3a and a parallel connected integrating member 3b forms a rated current value $I_{As}$ for the basic current control circuit. The current control circuit includes a current controller 4 to which is fed a control deviation value formed from the rated value $I_{As}$ or $-I_{As}$, and a value $I_A$ corresponding to the actual armature current value.

The current controller 4 controls a pulse generator 5 which furnishes the triggering pulses for the current rectifier groups 1,2. Specifically, the output from controller 4 varies the instant of occurrence, or pulse position, of the pulse from generator 5. Due to the direct phase opposition connection of the elements of current rectifier groups 1 and 2, precautions must be taken to assure that only one current rectifier group at a time carries current. This is accomplished by a switching logic 6.

Depending on the value of the output of speed controller 3, switching logic 6 switches the control pulses furnished by the pulse generator 5 through only one or the other of electronic switches 7 and 8 to the corresponding current rectifier group.

Since the actual current value determination occurs independently of the current direction by a measurement at the three phases of the input lines and subsequent rectification, there occurs via electronic switches 12 and 13, simultaneously with the switching of the pulses from one current rectifier group to the other, a switching of the polarity of the rated current value fed to current controller 4. To make both polarities available to controller 4, an inverting amplifier 11 is connected between speed controller 3 and switch 13. As is the custom in such control circuits, the rated current value $\pm I_{As}$ for the current controller is provided so as to have a negative polarity and correspondingly the actual current value $I_A$ is provided with a positive polarity. The switching logic monitors the actual motor armature current value $I_A$ and thus assures that upon a change in the direction of that current, the delivery of triggering pulses to the group till now carrying current is terminated only when the current in the till now conducting rectifier group has dropped to zero, since otherwise there would result a current flow which would cause a circuit breaker tripping. For a 50 Hz mains and a three-phase bridge circuit the conduction time of each rectifier below the limit of continuous current is $\leq$ 3.3 ms, for a 60 Hz mains the corresponding time would be $\leq$ 2.8 ms.

For safety reasons it is necessary for the switching logic to let at least this much time expire between the blocking of pulses to one rectifier group and the release of pulses to the other current rectifier group. During the waiting time the current controller 4 is blocked from producing an output by a signal over line 10a. As already mentioned, this results in no current delivery for periods of at least 4 ms.

In order to prevent further changes in the I component produced by the speed controller 3 due to the speed control deviation value being fed to the speed controller periods when no current is being delivered, a switch S is connected in series ahead of the I member 3b and is connected to a line 10b to be opened simultaneously with the blocking signal applied to line 10a, to which line 10b is connected. Thus, the parallel branch of speed controller 3 containing the I member 3b is switched off. Switch S may be of the electronic type and could be constituted basically by a transistor, particularly a FET.

Upon completion of the transfer of pulses from one rectifier group to the other, logic 6 releases, i.e., unblocks, current controller 4 simultaneously with the release of the triggering pulses for the newly activated rectifier group and reconnects the I member 3b to its input by closing switch S. These operations are effected by a suitable signal on lines 10a and 10b.

The current controller 4 may be a PI controller of the type mentioned earlier.

The circuitry of the pulse generator 5 is disclosed in the magazine "AEG-Mitteilungen" (AEG News), 1965, page 618, FIG. 9a.

The circuitry of the electronic switches 7, 8, 12 and 13 is disclosed in the publication "Application for FET Switches" by the firm Siliconix Limited.

The circuitry for the phase inverter amplifier 11 is disclosed in the "Handbook of Operational Amplifier Applications", 1963, page 13, of the firm Burr-Brown Research Corporation, Tucson, Arizona.

Speed controller 3 may also have the form of the circuit illustrated in FIG. 1 on page 468 of AEG-Telefunken Technical News, 1968. In this case, the P member 3a would correspond to the summing circuit in the upper left of the figure and the I member 3b would correspond to the integrator and memory at the lower right of the figure.

FIG. 2 shows a logic circuit which can serve as the logic 6 for creating the above-mentioned conditions for switching the triggering pulses for the reversing motor drive system of FIG. 1. The actual armature or rotor, current value $I_A$, the output voltage $U_{11}$ of the inverting amplifier 11 and the output voltage $U_3$ of the speed controller 3 are fed, as input signals to the switching logic, to threshold circuits 20, 21 and 22, respectively. When the output voltage of the speed controller 3 has a negative polarity, the output of circuit 22 provides an L (L = binary 1) signal and since the output voltage from amplifier 11 must then have a positive polarity, the output of circuit 21 produces an 0 signal. When the output voltage from controller 3 has a positive polarity, the outputs from circuits 21 and 22 are inverted.

If the actual current value $I_A$ is above a selected value, the output from circuit 20 has an 0 value, while if that current falls below a selected value during the no pulse interval, the output of circuit 20 flips from 0 to L and thus initiates the switching over from one rectifier group to the other, depending on the signals from circuits 21 and 22, by causing an output to be produced by one of the AND members 23 or 24. To store the signals from the AND members 23 and 24, memories 25 and 26 are provided. The storage is necessary since no L signal appears at the output of either one of AND members 23 and 24 when there is an 0 signal from circuit 20.

To prevent faulty switching, the two memories are interconnected so that one is automatically blocked when the other is producing an output.

Memory 25 is associated with AND member 23 and delay member 27, while memory 26 is associated with AND member 24 and delay member 28. Each memory is connected to apply an 0 signal to its delay member when an L signal appears at the output of its associated AND member. In addition an L signal from each AND member is connected to an internal OR gate of the other memory to cause that memory to apply an L signal to its respective delay member. Finally, the memories are interconnected, for security reasons, via the interval OR gates so that an L signal at the unused, or complement, output of one memory results in an L signal at that output of the other memory which is connected to the associated delay member.

The output signals of memories 25 and 26 are fed, via delay members 27 and 28, either to switches 7 and 12 or 8 and 13. One of the rectifier groups is activated each time an 0 signal occurs. For example, upon the appearance of an 0 signal at the output of delay member 27, switches 7 and 12 are closed, i.e., conduct and when an L signal appears at the output of member 27, switches 7 and 12 are opened.

Delay members 27 and 28 are of the type which block the transmission of pulses without any delay when the output of their respective memory has shifted from 0 to L, while the pulses are passed when the output of the respective memory shifts from L to 0 with a delay satisfying the above-mentioned safety requirements. During the waiting time after shifting of the outputs of the memories, an L signal is present at that outputs of both 27 and 28 so that an L signal is sent via an AND member 29 to the armature current controller 4 to block that controller.

The individual modules of the logic circuit are known, for example from the AEG publication "LOGISTAT Reihe I Daten and Applikationen" [series I, data and applications] (1912.102 A 24 Rgl/04.65) published in April 1965.

The internal circuitry of comparators 20, 21, and 22 corresponds to the internal circuitry of the measuring tripper MA2 on page 29 of the above publication.

The internal circuitry of the AND members 23, 24 and 29 is shown on page 33 of the above publication.

The internal circuitry of memories 25 and 26 is illustrated on page 42 of the above publication. Memories 25 and 26 each additionally contain one OR member whose internal circuitry is shown on page 35 of the above publication.

The internal circuitry of delay members 27 and 28 corresponds to the internal circuitry of time member ZL2 on page 49 of the above publication.

The present invention can be used for all types of reversing rectifier circuits without circulating current, it being immaterial whether the rectifiers are operated in parallel opposition or cross-connection. The invention is not limited in application to speed or voltage controlled reversing drives. It may be used with the same success, for example, for position or direction controlled reversing drives. The practice of the invention only requires that at least one of the controllers connected to the current controller have an integrating component as this is the case, for example, for I, PI or PID (proportional-integral-differential) controllers.

The current controllers may, for example, feed the armature current circuit or the field current circuit of a direct current motor or generator operated in both rotational directions.

It will be understood that the above description of the present invention is susceptible to various modifications, changes and adaptations, and the same are intended to be comprehended within the meaning and range of equivalents of the appended claims.

I claim:

1. In a system for directing a current controller of the type employing two groups of controlled rectifiers for delivering current in respectively opposite directions through a load, the system being composed of a pulse generator connected for applying conduction control pulses to one group of rectifiers at a time, means for preventing the transmission of pulses to either rectifier group for a time interval when the delivery of pulses is being shifted from one rectifier group to the other, a current controller connected for controlling the production of pulses by the pulse generator, and at least one higher order controller connected to apply a control signal to the current controller, the higher order controller having a signal integrating member, the improvement comprising means connected to said integrating member for suppressing the action of said integrating member during each such time interval when the transmission of pulses is being prevented.

2. An arrangement as defined in claim 1 wherein said higher order controller is a speed controller with proportional-integrating behavior and comprises a parallel connection of a proportional member and an integrating member, and an electronic switch connected in the input of said integrating member for blocking the input of said integrating member for switching during each such time interval.

3. An arrangement as defined in claim 2 wherein said means for preventing blocks the output of said current controller during each such interval and is connected to render said electronic switch nonconductive or conductive in synchronism with the blocking or release of said current controller.

* * * * *